Aug. 28, 1956  S. J. FONS  2,760,792
DIVIDED AND PACKED PIPE COUPLING SLEEVE
Filed April 2, 1952  3 Sheets-Sheet 1
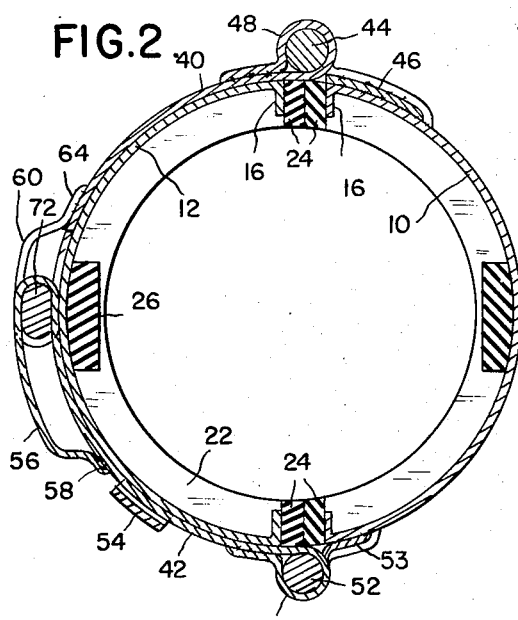
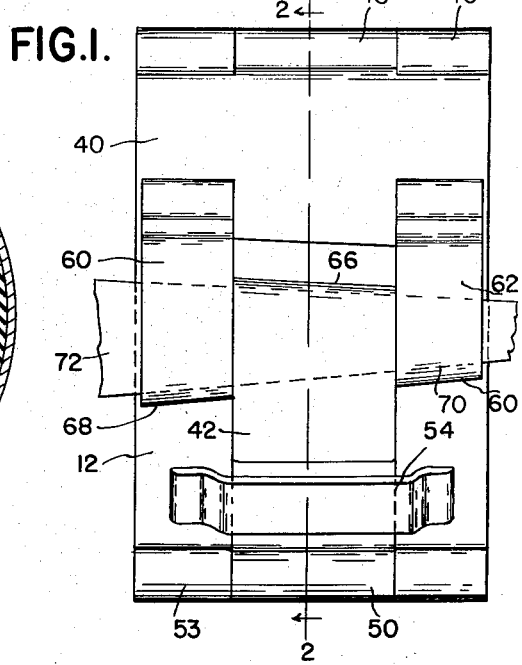
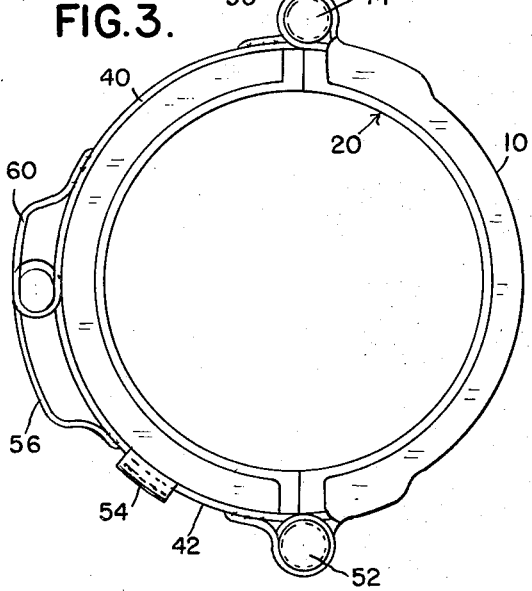
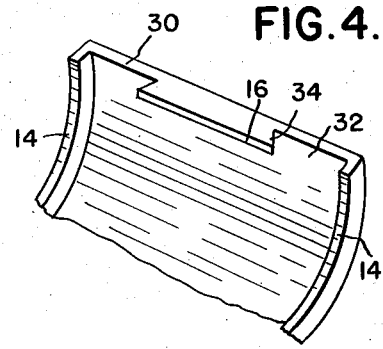
INVENTOR.
STANLEY J. FONS
BY Whittemore
Hulbert & Belknap
ATTORNEYS.

Aug. 28, 1956   S. J. FONS   2,760,792
DIVIDED AND PACKED PIPE COUPLING SLEEVE

Filed April 2, 1952.   3 Sheets-Sheet 2

INVENTOR.
STANLEY J. FONS
BY
ATTORNEYS

Aug. 28, 1956 S. J. FONS 2,760,792
DIVIDED AND PACKED PIPE COUPLING SLEEVE
Filed April 2, 1952 3 Sheets-Sheet 3
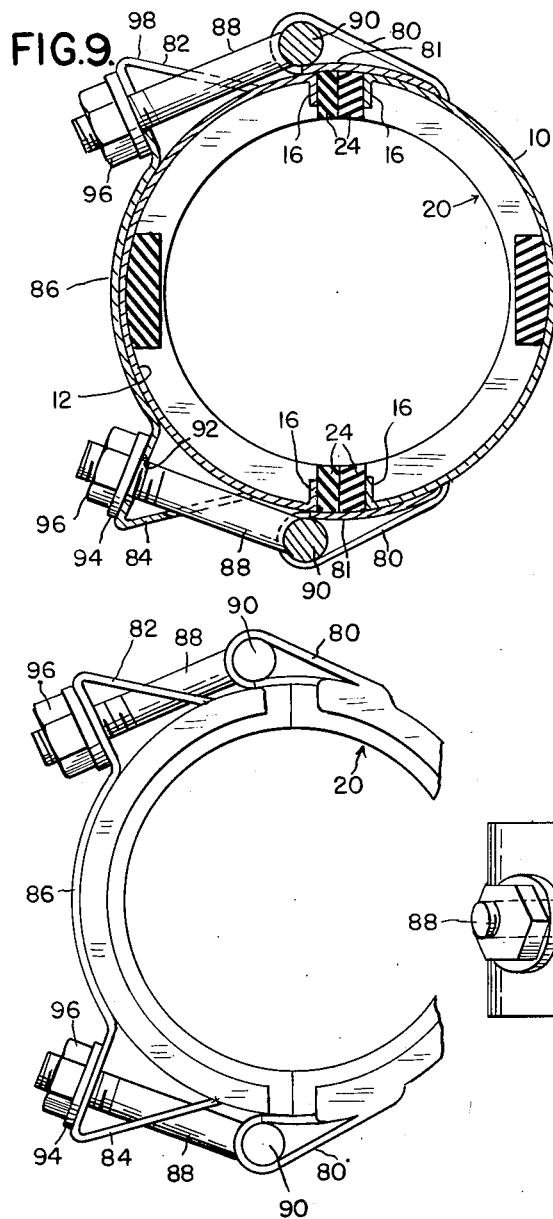
FIG.9.
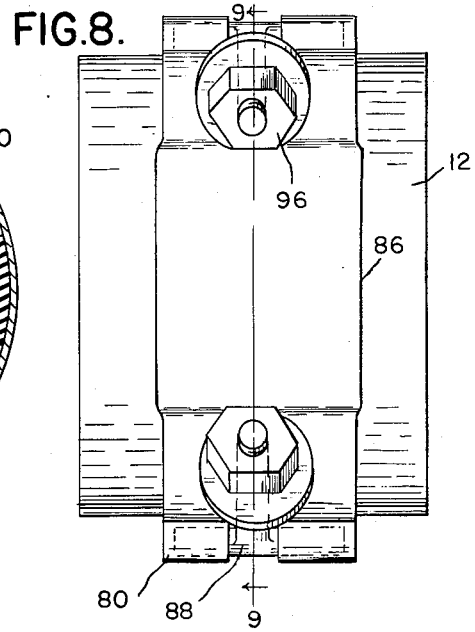
FIG.8.
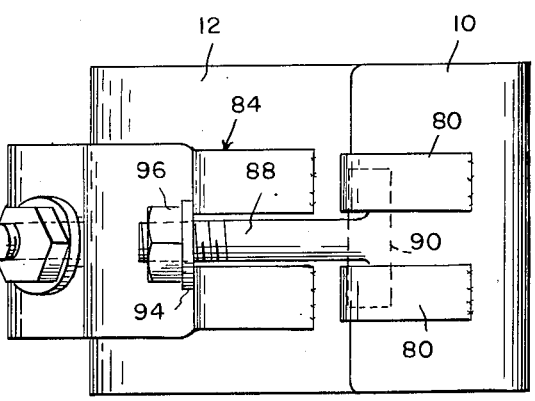
FIG.11.
FIG.10.
INVENTOR.
STANLEY J. FONS
BY *Whittemore*
*Hulbert & Belknap*
ATTORNEYS

United States Patent Office 2,760,792
Patented Aug. 28, 1956

2,760,792

DIVIDED AND PACKED PIPE COUPLING SLEEVE

Stanley J. Fons, Huntington Woods, Mich.

Application April 2, 1952, Serial No. 280,127

4 Claims. (Cl. 285—373)

The present invention relates to a pipe coupling and is a continuation-in-part of my prior copending application Serial No. 224,909 filed May 7, 1951.

It is an object of the present invention to provide a pipe coupling comprising a pair of generally semi-cylindrical elements in conjunction with means for clamping the elements together about the juxtaposed ends of a pair of pipe sections with provision for relative circumferential adjustment between the elements so as to provide an equalized seal at opposite sides of the elements.

It is a further object of the present invention to provide a pipe coupling comprising a pair of generally semi-cylindrical members, each provided with a sealing gasket, means carried by one of said members and engageable with the other to press said other member into mating relation with said one member, with provision for relative angular circumferential movement between the members.

More specifically, it is an object of the present invention to provide a pipe coupling comprising a pair of generally semi-cylindrical members, a pair of clamping elements pivotally secured to one of said members, the other of said members being loosely secured to one of said clamping members, and means for actuating said clamping members to press said other member into mating relation with said one member.

Other objects and features of the invention will become apparent as the description proceeds, especially when taken in conjunction with the accompanying drawings, wherein:

Figure 1 is a side elevation of one embodiment of pipe coupling.

Figure 2 is a section on the line 2—2, Figure 1.

Figure 3 is an end elevation of the pipe coupling illustrated in Figure 1.

Figure 4 is a fragmentary perspective view through a portion of a case member.

Figure 8 is a side elevation of a modified form of coupling.

Figure 9 is a section on the line 9—9, Figure 8.

Figure 10 is a fragmentary end elevation of the coupling shown in Figure 8.

Figure 11 is a side elevation of the coupling shown in Figure 8 from a position displaced 90 degrees from the position shown in Figure 8.

Referring now to Figures 1–7, the coupling comprises a pair of generally semi-cylindrical case members 10 and 12. These members are of a circumferential extent somewhat less than 180 degrees. Preferably, the case members are formed of relatively heavy sheet metal stampings and are provided with curved inwardly extending side flanges 14 and straight inwardly extending end flanges 16. The flanges 14 are continuous from side to side of the case members. The flanges 16 on the other hand, are located intermediate the ends of the case members and are spaced inwardly from the ends thereof.

Figure 5:
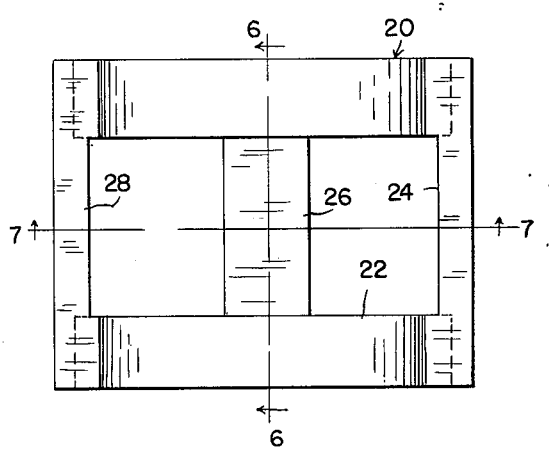
Figure 5 is a plan view of a sealing gasket employed in the coupling.
Figure 6:
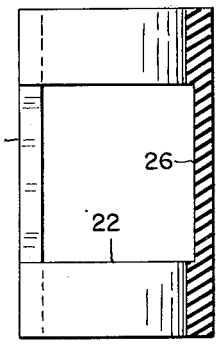
Figure 6 is a section on the line 6—6, Figure 5.
Figure 7:
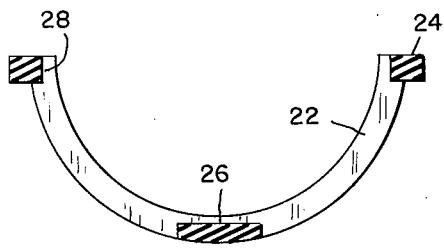
Figure 7 is a section on the line 7—7, Figure 5.

Each of the case members 10 and 12 has associated therewith a sealing gasket 20, details of which are best seen in Figures 5–7. The sealing gaskets 20 are of overall generally cylindrical configuration and include relatively thick semi-cylindrical ribs 22 interconnected at their ends by longitudinally extending ribs 24. The intermediate portions of the ribs 22 are interconnected by a transversely extending part 26. The ribs 24 extend radially outward from the ends of the ribs 22 and the interior surfaces of the ribs 24 are cut back to provide recesses 28.

The gaskets 20 are received in the case members 10 and 12 so that the radially outwardly extending portions of the ribs 24 overlie the side walls 30 of the case members and in addition, overlie the inwardly extending flanges 16 at the sides thereof. The relatively thick ribs 22 lie along the inner concave surface of the case members and the outer surfaces of the ribs 22 abut the inner surfaces of the flanges 14. Since the ribs 24 extend to the sides of the gasket, they extend through the spaces indicated at 32 between the ends of the flange 16 and the adjacent end portion of the flange 14. The ends of the flange 16 are inclined as indicated at 34 to provide interlocking projections engageable with the ribs 22 and these projections embed themselves in the material of the ribs and retain the gaskets firmly in assembled relation in the corresponding case members.

Means are provided for holding the case members 10 and 12 together and as best illustrated in Figure 2, this results in establishing a sealing engagement by clamping the ribs 24 of the gaskets between the flanges 16 of the case members. At the same time the curved ribs 22 are compressed inwardly against pipe ends introduced into opposite sides of the coupling. There is thus established a firm adequate seal which prevents leakage and also serves as a mechanical coupling for the adjacent ends of the pipe sections.

One of the important advantages of the present invention is that the parts are constructed and arranged to permit relative circumferential movement between the case members 10 and 12 so as to equalize pressure on the sealing ribs 24 at opposite sides of the joint. Without this provision any slight variation in pipe diameter or in fact, any irregularity resulting from angularity of the pipes, might result in substantially the entire clamping pressure exerted on the case members 10 and 12 being taken up at one side of the joint, with a resultant lack of seal at the opposite side. In the present case this is accomplished by providing one of the case members, as for example the case member 10, with a pair of clamping members in the form of curved arms 40 and 42. The arm 40 is pivoted to the case member 10 adjacent one side thereof by a hinge pin 44 supported on an ear 46 welded to the external surface of the case member. For this purpose one end of the arm 40 is shaped into a loop 48 to receive the pivot pin 44. In like manner, the curved arm 42 has a looped portion 50 receiving a pivot pin 52 carried by a bracket 53 welded to the opposite side of the case member 10. The case member 12, as best seen in Figure 1, is provided with guide means coupling it to arm 42 comprising a strap 54 through which the curved arm 42 extends. The strap 54 is shaped to provide a relatively enlarged opening so that the case member 12 is relatively loose with respect to the curved arm 42. At its inner end the curved arm 42 is reversely bent as indicated at 56 to provide an eye and the end of the reversely bent portion is welded to the curved arm 42 as indicated at 58. The curved arm 40 is provided with a pair of ears 60 and 62 which are also reversely bent to provide eyes and have their reversely bent ends welded to the arm 40 as indicated at 64. The arm 42 is of relatively narrow width and is disposed to be received between the ears 60 and 62. Moreover, the end surface 66 of the arm 42 and the end surfaces 68 and 70 of the ears 60 and 62 respectively, are inclined to cooperate with a tapered pin 72. As a result, when the pin 72 is driven to the right as seen in Figure 2 through the eyes provided by the reversely bent arm portions, the arms 40 and 42 are forced tightly against the case member 12. However, the case member 12 is not rigidly secured to either of the arms and maintains its capacity for circumferential movement relative to the case member 10. Thus, the case member 12 centralizes itself so as to establish substantially equal pressure on the sealing ribs 24 at opposite sides of the joint.

Referring now to Figures 8-11 there is illustrated a somewhat different embodiment of the invention. In this embodiment of the invention the case member 10 is provided with ears 80 at opposite sides thereof, these ears including plates 81 which extend beyond the side of the case member 10 so as to overlie the space between the inturned flanges 16 as is apparent from an inspection of Figure 9. The case member 12 is provided with a pair of ears 82 and 84, these ears being illustrated as including a central connecting portion 86 and being welded to the case member 12. The ears 80 carry T-head bolts 88, the head 90 of the bolt being pivoted to the ears 80. The ear 84 is provided with a bolt receiving opening 92 and the bolt at its outer end carries a washer 94 and a nut 96. It is contemplated that the nut 96 may be loosened but will not be removed from the bolt 88 and will thereby retain the case member 12 loosely assembled with the case member 10 through the T-bolt 88. The ear 82 however, is provided with a slot 98 which is open at its outer side so that the T-bolt 88 associated therewith may be swung into and out of cooperating relation with respect to the ear 82 without removing the nut 96 therefrom. With this arrangement the pressure at opposite sides of the coupling exerted on the ribs 24 may be independently adjusted, and it will also be observed that in this construction the case member 12 is circumferentially adjustable with respect to the case member 10.

Referring again to Figure 9 it will be observed that when the nuts 96 are tightened, the plate portions 81 of the ears 80 overlap the space between adjacent flanges 16 of the case members 10 and 12 and thus prevent outward displacement of the ribs 24. Thus, relatively great pressure may be applied by tightening the nuts 96 so that the ends of the pipe sections may be adequately sealed against relatively great pressure or suction, or at the same time mechanically interconnected so as to withstand substantial forces tending to separate them.

The use of the wedge as disclosed in the embodiment of the invention illustrated in Figure 1, permits most rapid assembly and disassembly of the coupling. Moreover, since the wedge is disposed parallel to the axis of the coupling, the wedge does not protrude laterally beyond the sides of the coupled pipes. The use of the bolted clamps is slower but provides for more control over pressures at opposite sides of the joint.

Where liquid is pumped which must be kept out of contact with the coupling, the gaskets may be continuous and not have the openings shown in Figures 5-7. If gasoline or similar liquid is to be pumped, the gaskets will be of synthetic rubber not affected by such liquids.

The coupling may be used to connect heavy pipe, light tubing, and pipe or tubing of materials other than metal, such for example as plastic.

The drawings and the foregoing specification constitute a description of the improved pipe coupling in such full, clear, concise and exact terms as to enable any person skilled in the art to practice the invention, the scope of which is indicated by the appended claims.

What I claim as my invention is:

1. A pipe coupling comprising a pair of generally semi-cylindrical sheet metal case members having straight sides and arcuate ends of slightly less than 180 degrees angular extent, radially inwardly extending continuous flanges at the arcuate ends of said case members extending from side to side thereof, radially inwardly extending flanges at the straight sides of said case members terminating short of the arcuate ends thereof, generally cylindrically shaped gaskets in said case members having relatively thick arcuate ribs at the ends thereof engaging the inner surfaces of the arcuate flanges at the ends of said case members and straight generally outwardly extending flanges on the straight sides of said gaskets received between the inwardly extending flanges at the straight sides of said case members, the ends of said ribs connecting to the ends of the straight flanges at the sides of said gasket through the space provided between the ends of the straight flanges at the sides of said case members and the adjacent ends of the arcuate flanges at the ends of said case members, and cylindrically curved means at both sides of one of said case members extending circumferentially beyond the sides thereof and engaging the outer cylindrical surface of the side portions of the other case member and providing abutments for the radially outer surfaces of the flanges at the straight sides of said gaskets, and clamping means including parts hinged to one of said case members for clamping said case members and gaskets together around the adjacent ends of two sections of pipe.

2. A coupling as defined in claim 1 in which said cylindrically curved means comprises in part hinge mountings to which the hinged parts of said clamping means are secured.

3. A coupling as defined in claim 2 in which the hinged parts of said clamping means comprise bolts hinged to said hinge mountings and ears on the other of said case members receiving said bolts.

4. A coupling as defined in claim 2 in which the hinged parts of said clamping means comprise cylindrically curved arms having wedge receiving eyes at their free ends movable into registration in assembly, and a wedge received in said eyes.

References Cited in the file of this patent

UNITED STATES PATENTS

| | | |
|---|---|---|
| 34,888 | Hoskin | Apr. 8, 1862 |
| 249,766 | Hunt | Nov. 22, 1881 |
| 544,943 | Woodside | Aug. 20, 1895 |
| 549,594 | Cooper et al. | Nov. 12, 1895 |
| 649,916 | Dietrich | May 22, 1900 |
| 1,637,081 | Lemerond | July 26, 1927 |
| 1,659,196 | Fulton | Feb. 14, 1928 |
| 2,127,456 | Adams | Aug. 16, 1938 |
| 2,417,741 | Dillon | Mar. 18, 1947 |
| 2,426,423 | Woolsey | Aug. 26, 1947 |
| 2,437,246 | Drinkwater | Mar. 9, 1948 |
| 2,463,235 | Andrews | Mar. 1, 1949 |